United States Patent [19]

Nishigaki et al.

[11] Patent Number: 4,870,483
[45] Date of Patent: Sep. 26, 1989

[54] COLOR IMAGE SENSOR INCLUDING A PLURALITY OF PHOTOCELLS AND A PLURALITY OF COLORED FILTERS PROVIDED ON THE PLURALITY OF PHOTOCELLS

[75] Inventors: Yuji Nishigaki, Odawara; Naoto Kawamura, Yokohama, both of Japan

[73] Assignee: Canon Kabushiki Kaisha, Tokyo, Japan

[21] Appl. No.: 300,208

[22] Filed: Jan. 23, 1989

Related U.S. Application Data

[63] Continuation of Ser. No. 912,122, Sep. 29, 1986, abandoned.

[30] Foreign Application Priority Data

Oct. 2, 1985 [JP] Japan .................................. 60-218134
Oct. 4, 1985 [JP] Japan .................................. 60-220171

[51] Int. Cl.$^4$ ......................... H04N 1/018; H04N 9/07
[52] U.S. Cl. ...................................... 358/44; 358/55; 358/75
[58] Field of Search .................. 358/41, 43, 44, 75, 358/55, 213.11, 213.13, 285, 293, 294; 250/578

[56] References Cited

U.S. PATENT DOCUMENTS 4,567,374 1/1986 Takenouchi et al. ............... 250/578
4,644,411 2/1987 Sato et al. ........................... 358/294
4,663,656 5/1987 Elabd et al. ......................... 358/75
4,734,787 3/1988 Hayashi .............................. 358/293
4,776,031 10/1988 Mita .................................... 382/67

FOREIGN PATENT DOCUMENTS 80945 4/1986 Japan .

Primary Examiner—James J. Groody
Assistant Examiner—Robert M. Bauer
Attorney, Agent, or Firm—Fitzpatrick, Cella, Harper & Scinto

[57] ABSTRACT

A color image sensor has a plurality of sensor parts aligned in line and the sensor parts are a plurality of sensor chips with filters of a plurality of colors and arranged in line. In this sensor, one of the sensor parts which corresponds to one of the plurality of colors and which influences resolution only to a small extent is omitted at a junction between adjacent ones of the sensor chips. Alternatively, in this sensor, sensor parts with a plurality of filters having a relatively high transmittance, among the filters of the plurality of colors, are alternately arranged to constitute a first sensor row, and sensor parts with filters having a relatively low transmittance are arranged in line to constitute a second row. The second row is parallel to the first row. Each sensor part constituting the second row is larger than that constituting first row.

10 Claims, 5 Drawing Sheets

COLOR IMAGE SENSOR INCLUDING A PLURALITY OF PHOTOCELLS AND A PLURALITY OF COLORED FILTERS PROVIDED ON THE PLURALITY OF PHOTOCELLS

This application is a continuation of application Ser. No. 912,122 filed Sept. 29, 1986, now abandoned.

BACKGROUND OF THE INVENTION

1. Field of the Invention

The present invention relates to a color image sensor and, more particularly, to a contact type color image sensor wherein photocells having a plurality of color filters are aligned in line.

2. Related Background Art

Typical conventional original reading systems using color image sensors include systems for reducing the size of an image and reading a reduced image and systems for focusing and reading an image of an equal size. The latter system has been popular in recent years since adjustment is simple and the required amount of light is small. In the original reading system for focusing and reading an image of equal size, however, an elongated sensor is required.

Typical conventional color original reading systems include light source switching type systems and tricolor separation type systems using filters. The latter system is further classified into a tricolor sequential reading system for sequentially reading three color components by a single line sensor according to filter switching, a system for simultaneously reading three color components by using three line sensors, and a system for simultaneously reading three color components by using a single color line sensor chip having a tricolor stripe filter thereon.

A sensor chip with equal size type tricolor filters has recently received a great deal of attention since it can read a color image at high speed. However, in order to cause this sensor to read an image at the same reading density as that of a black-and-white sensor, the tricolor filter sensor chip must have a reading density three times that of the black-and-white sensor.

A CCD (Charge-Coupled Device) sensor is used as a typical conventional contact type color line sensor, as shown in FIG. 1. Photocells 10 each consisting of a red (R) filter, a green (G) filter, and a blue (B) filter are aligned in a line. Sensor parts of a sensor chip 100 include red filters, 1A, 2A, 3A, and 4A, green filters 1B, 2B, 3B, and 4B, and blue filters 1C, 2C, 3C, and 4C.

The sensor parts are arranged in the order of 1A, 1B, 1C, 2A, 2B, 2C, ..., and a set of R, G, and B sensor parts, e.g., 1A, 1B, and 1C, constitute a photocell 10 serving as one pel, thereby obtaining a predetermined resolution. For example, in order to read an image at a rate of 10 pels/mm for each color component, the width of one pel, i.e., a pitch p of pels is 1/16 mm. The width b of each sensor part 1A, 1B, 1C in the photocell 10 is narrower than p/3. For example, if $p = 62.5 \mu m$, then the width b of each sensor part must be 20.8 $\mu m$ or less. If a light-shielding width a of about 5 $\mu m$ between the sensor parts is taken into consideration, the width b of each sensor part must be about 15.8 $\mu m$. It should be noted that the sensor parts 1A, 1B, 1C, . . . are formed on the sensor chip 100.

This conventional sensor chip with equal size type tricolor filters requires a high-density elongated sensor, as described above. If photoelectric transducer elements are formed on a silicon wafer in order to use a CCD or MOS image sensor as the elongated sensor, the chip size of the image sensor is limited by the silicon wafer size. For example, if a 4" wafer is used, the chip size of the image sensor is 100 mm or less.

In order to constitute a line sensor having an A4 (210 mm) width, a plurality of image sensor chips must be arranged linearly or in a staggered manner.

FIG. 2 shows an example of a line sensor 110 obtained by arranging CCD sensor chips 100 (FIG. 1) in a staggered manner within the A4 width. The length of each CCD sensor chip varies according to the silicon wafer size. However, each of CCD sensor chips 100A to 100E has a length falling within the range of 50 to 60 mm. In order to arrange the CCD sensor chips to cover the A4 width (210 mm), at least four or five chips 100 are required. Since the light-shielding width a is very small, the adjacent chips 100 cannot be aligned in line with such a small gap. As a result, the staggered arrangement is inevitably employed, as shown in FIG. 2.

With the arrangement in FIG. 2, a distance k between the upper and lower rows must be corrected in the read mode. For this purpose, an external correction line memory or buffer memory must be arranged, and at the same time processing is required to link the data read by the adjacent line sensors.

On the other hand, the linear arrangement of the line sensor does not require a buffer memory and data link processing, unlike the staggered arrangement. However, in order to eliminate a read disable area, photoelectric transducer elements such as photodiodes must be arranged to the very end of the chip. The chip must then be cut or scribed with higher precision, and the resultant chips must be aligned in line on a substrate with higher precision.

In particular, a color sensor requires a tricolor separation filter unit so that the reading density of the photoelectric transducer elements in the main scanning direction (i.e., the line direction) is three times that of a black-and-white sensor. For example, as described above, if the reading density is 16 pels/ mm, the element density of the color sensor is 48 elements/mm, and the element pitch is about 20 $\mu m$. It is very difficult to form the photodiodes within this element pitch and to precisely cut the wafer without damaging the photodiodes.

Since the spectral sensitivity of the blue (B) filter is normally poor. the level of the blue signal as a sensor output is low and an S/N ratio is undesirably low.

SUMMARY OF THE INVENTION

It is an object of the present invention to provide a linear color image sensor which can eliminate the conventional drawbacks described above and which can be easily fabricated.

It is another object of the present invention to provide a color image sensor which can provide uniform output characteristics of the respective color components and which can be easily manufactured.

It is still another object of the present invention to provide a color image sensor for outputting a one-line image signal without requiring complicated post processing.

According to an aspect of the present invention, there is provided a color image sensor having a plurality of color sensor chips aligned inline, wherein one photoelectric transducer element is omitted from a color filter which is located at a junction of chips and which influences resolution only a little, thereby reducing cutting damage and simplifying the fabrication process in favor of low cutting and alignment precision requirements.

According to another aspect of the present invention, sensor parts have a plurality of parallel filters with a relatively high transmittance, and the sensor pats are alternately aligned in a direction perpendicular to the longitudinal direction of the parallel filters. Sensor parts having a low filter transmittance are aligned parallel to the sensor parts of the relatively high transmittance such that the longitudinal direction of the sensor parts having a low filter transmittance is perpendicular to that of the sensor parts having a high filter transmittance. The length of each sensor part having a low filter transmittance corresponds to the total width of the sensor part having a high filter transmittance.

The above and other objects, features, and advantages of the present invention will be apparent from the following detailed description in conjunction with the accompanying drawings.

DETAILED DESCRIPTION OF THE PREFERRED EMBODIMENTS

Preferred embodiments of the present invention will be described in detail with reference to the accompanying drawings.

Figure 4:
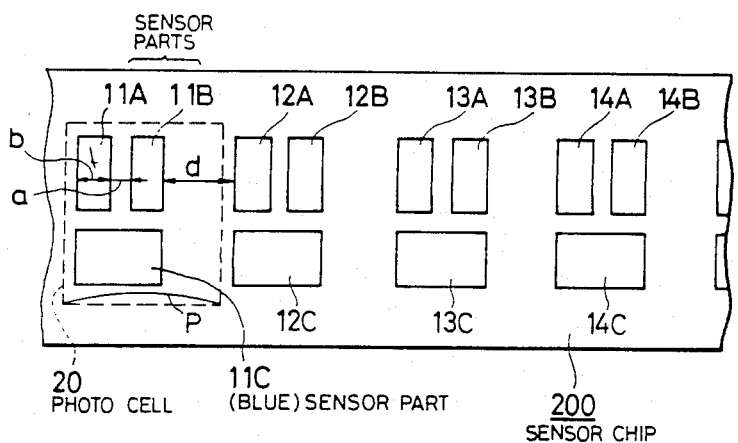
FIG. 4 is a plan view showing a color read line sensor chip according to an embodiment of the present invention.

FIG. 4 shows an embodiment of the present invention. In this embodiment, each photocell 20 constitutes one pel (1/16 mm). The photocell 20 consists of three sensor parts 11A, 11B, and 11C having a red filter R, a green filter G, and a blue filter B. Each sensor part includes photoelectric transducer elements such as photoconductors, photodiodes, or MOS transistors. The photocells 20 are arranged at a predetermined pitch, as shown in FIG. 4. Only the sensor parts 11C having the blue filters B are arranged in a row different from that of the sensor parts 11A and 11B of other two colors. A first row including a plurality of pairs each consisting of R and G sensor parts 11A and 11B, and a second row including a plurality of B sensor parts 11C are thus formed.

In a sensor chip 200 having the arrangement described above, the light-shielding width d between the photocells 20 constituting the pels is represented by the following equation:

$$d = p - (2b + a) \quad \ldots (1)$$

where
- a: the light-shielding width between the R and G sensor parts within an identical photocell
- b: the light-receiving width of the sensor part
- p: the alignment pitch of the photocells.

Figure 1:
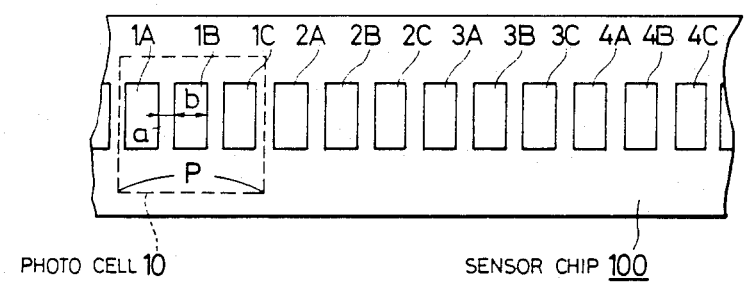
FIG. 1 is a plan view showing a conventional color reading line sensor chip.
Figure 2:
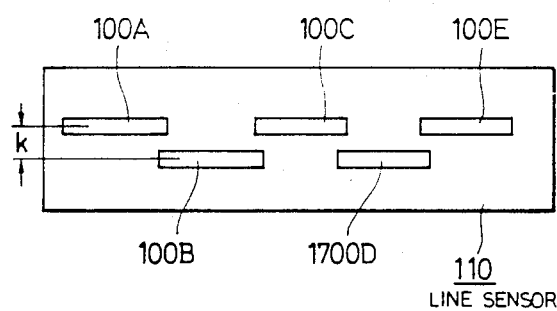
FIG. 2 is a plan view of an arrangement of sensor parts on the sensor chip shown in FIG. 1.
Figure 3:
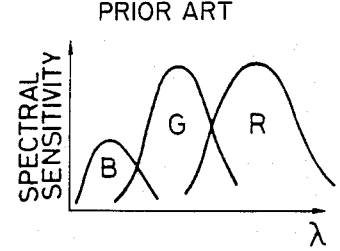
FIG. 3 is a graph showing the characteristics of the output from the line sensor in FIG. 2.

If the widths a and b in equation (1) and the pitch P of the photocells 20 are the same as those in FIG. 1, $$p = 3(a + b) \quad (2)$$

the light-shielding width d between the adjacent photocells in the construction of FIG. 4 is $$d = b + 2a \quad (3) \quad \ldots (3)$$

the light-shielding width d in FIG. 1 is equal to a, and the light-shielding width between the adjacent cells in FIG. 4 can be increased by $a + b$ as compared with that in FIG. 1.

Substitutions of $a = 5$ μm and $b = 15.8$ μm exemplified in FIG. 1 into equation (1) yield, $$d = 25.8 \, \mu m$$

The width ($d = a = 5$ μm) of FIG. 1 can be increased by 20.8 μm in the arrangement of FIG. 4.

Figure 5:
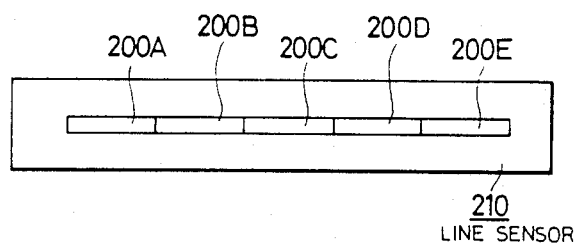
FIG. 5 is a plan view of a linear arrangement of the sensor chips shown in FIG. 4 to constitute a line sensor.
Figure 6:
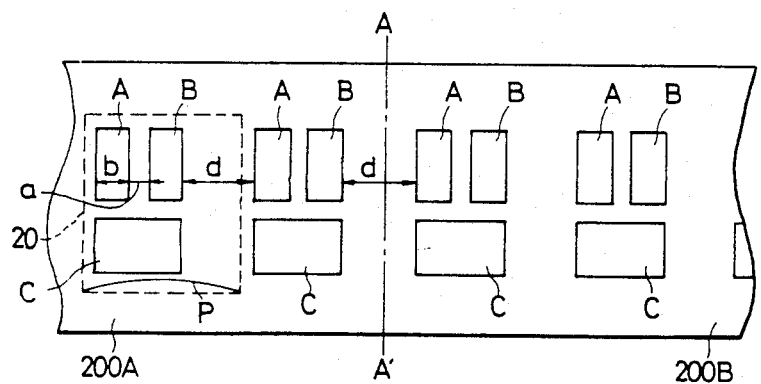
FIG. 6 is a plan view showing a connecting state of the sensor chip in FIG. 4.

FIG. 5 shows a linear arrangement of sensor chips 200 (FIG. 4) to cover the A4 width. More specifically, five chips 200A to 200E are aligned in line. In this case, the chips 200A and 200B, the chips 200B and 200C, ... are bonded to each other on a plane along the line A—A' to constitute a line sensor 210.

Since the sensor chips can be connected within the length of $d = 25.8$ μm, the plurality of sensor chips 200A, 200B, ... can be aligned in line.

Figure 7:
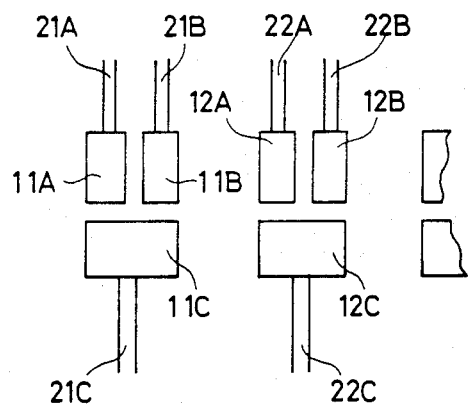
FIG. 7 is a plan view showing the wiring of the line sensor chip in FIG. 4.
Figure 8:
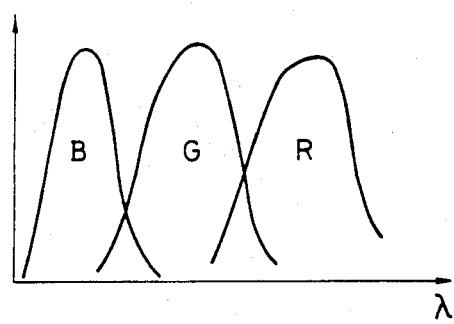
FIG. 8 is a graph showing characteristics of the output from the sensor chip in FIG. 4.

In the line sensor 210 having the construction described above, the two rows of sensor parts are driven in parallel. Outputs are sequentially generated from the first row of sensor parts 11A and 11B, 12A and 12B, ..., and outputs are sequentially generated from the second row in synchronism with the outputs from the sensor parts 11A and 11B, the sensor parts 12A and 12B, FIG. 7 shows electrode wirings connected to the sensor parts. Wiring layers, 21A, 21B, 22A, 22B are respectively connected to the sensor parts 11A, 11B, 12A, and 12B, and wiring layers 21C, 22C, ... are respectively connected to the sensor parts 11C, 12C, .. . Therefore, the wiring structure consists of the wiring layers of the first and second rows. In each photocell 20, the light-receiving area of the blue (B) sensor part 11C can be larger than that of the red (R) or green (G) sensor part 11A or 11B. Therefore, the B, G, and R output levels are equalized, as is apparent from the spectral sensitivity shown in FIG. 8.

Figure 9A:
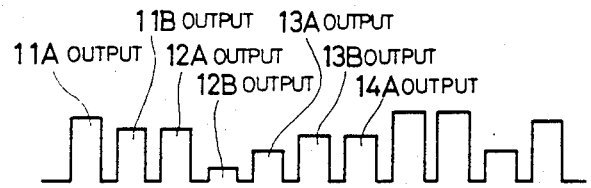
FIGS. 9A and 9B are timing charts of signal trains output from the first and second sensor rows of the line sensor.
Figure 9B:
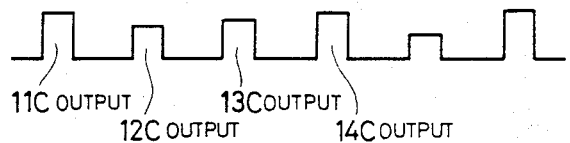

FIGS. 9A and 9B show outputs from the CCD sensor parts arranged in two rows. More specifically, FIG. 9A shows outputs from the R and G sensor parts of the first row in an order of 11A, 11B, 12A, 12B, 13A, 13B, . . . , and FIG. 9B shows outputs from the B sensor parts of the second row in an order of 11C, 12C, 13C, . . .

Figure 10:
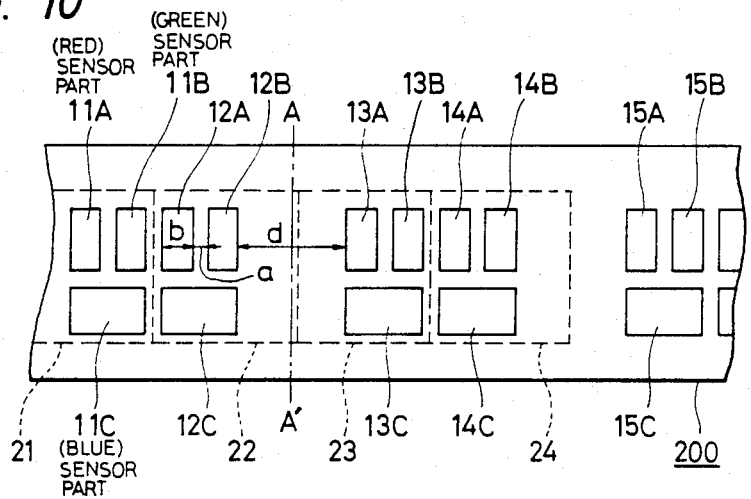
FIG. 10 is a plan view showing an arrangement of sensor parts on a sensor chip according to another embodiment of the present invention.

FIG. 10 shows another sensor arrangement according to another embodiment of the present invention. In this arrangement, sets of three sensor parts constituting the one-pel photocells 21, 22, . . . are located in different positions in adjacent pels. More specifically, the sensor parts are located at the right end within the area corresponding to the pel 21, and the sensor parts are located at the left end within the area corresponding to the pel 22. In this manner, the pels 21 and 22, the pels 23 and 24 come close to each other, and large light-shielding widths d are assured between pels 22 and 23 and between pels 24 and 25, respectively. Therefore, $$d = 2(p - 2b - 3a/2) \quad (4)$$

In the same manner as described above, $$d = 2b + 3a \text{ for } p = 3(a+b).$$

If $a = 5$ μm and $b = 15.8$ μm, as in FIG. 1, $d = 46.6$ μm in the construction of FIG. 10. The width is larger than that ($d = a = 5$ μm) in FIG. 1 by 41.6 μm. Therefore, it is easier to align the chips 200 in line, as shown in FIG. 5.

There are two driving methods when the chips 200 are aligned in line, as shown in FIG. 5. First, the chips 200A to 200E are operated according to parallel driving. Parallel outputs are generated from the chips. According to this driving method, an output stage is connected to the transfer gate of the last sensor of each chip. The output stage is aligned in a direction perpendicular to the transfer direction of the transfer gate.

Second, the chips 200 are sequentially driven. The chips 200A to 200E are aligned in line to constitute elements and are driven as if the elements constitute a single element. In this case, wire bonding is required to allow charge transfer between the adjacent chips.

Figure 11:
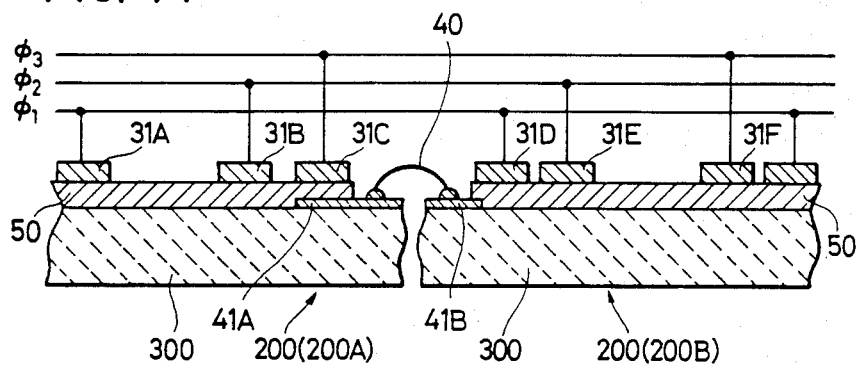
FIG. 11 is a sectional view showing the connection of chips in the line sensor

FIG. 11 shows a three-phase driven state of a structure for realizing the second driving method. Drive signals $\phi 1$, $\phi 2$, and $\phi 3$ having different phase differences are applied to sensor part electrodes 31A and 31D, 31B and 31E, and 31C and 31F, respectively. The charges are transferred according to the conventional CCD transfer scheme. Aluminum electrodes 41A, 41B, . . . are formed on end portions of n-Si substrates 300 of the chips 200 by special processing. The electrodes 41A and 41B, . . . are connected by corresponding bonding wires 40. The n-Si substrate regions of the substrates 300 are kept at an identical potential by directly forming the electrodes 41A, 41B, . . . on the corresponding n-Si substrates 300. The electrodes 31A, 31B, . . . are formed on insulating films 50 on the n-Si substrates 300.

With the arrangement, the signal is transferred from, e.g., the chip 200A to the chip 200B. The large space guaranteed by the width d described above is required for the bonding wires 40. The space must be at least ⅓ the pel pitch p.

The above embodiment exemplifies a color reading line sensor having the red, green, and blue filters. The colors of filters are not limited to these. For example, yellow, green, and cyan filters may be used in place of the blue, green, and red filters. In the YGC system, the sensor parts corresponding to the green filters are arranged to constitute the second row to guarantee the large area therefor.

According to this embodiment as described above, the sensor parts of two color components having a relatively high transmittance are paired, and the pairs are formed on the chip in line to constitute a first row. The sensor parts of the remaining color component having a relatively low transmittance are aligned in line to constitute a second row. The second row is parallel to the first row. The length of the sensor part having a low filter transmittance is set to be equal to the entire width of the sensor part pair of the first row. Therefore, equal output characteristics can be obtained for the respective color components. In addition. a sufficiently wide connection gap between the adjacent chips constituting the line sensor can be assured.

In the above embodiment, the light-shielding width between the adjacent photocells is kept wide to align the plurality of sensor chips in line.

Another arrangement of a plurality of sensor chips aligned in line will be described according to still another embodiment of the present invention.

In an apparatus for reading a color original and outputting a color print, yellow (Y), magenta (M), and cyan (C) inks or toners are used. The human visual sensitivity has a lowest resolution for yellow and poor detection precision of changes in density of yellow.

Based on these facts, one photoelectric transducer element of a yellow filter is omitted, and signals from yellow pels adjacent to the omitted yellow pel are used for interpolation. It is found that the human visual sensitivity cannot distinguish yellow derived from the actual yellow pel from yellow derived from an interpolated result.

Similarly, if a tricolor separation filter has red (R), green (G), and blue (B) components, blue corresponds to yellow as a complementary color thereof.

In this case, one photoelectric transducer element of the blue filter is omitted, and signals from blue pels adjacent to the omitted yellow pel are used for interpolation. It is also found that the human visual sensitivity cannot distinguish blue derived from the actual blue pel from blue derived from an interpolated result.

Based on these facts, a photoelectric transducer element corresponding to a yellow medium for a printer and partially constituting one pel is omitted in the linear arrangement of a plurality of color sensor chips.

Figure 12:
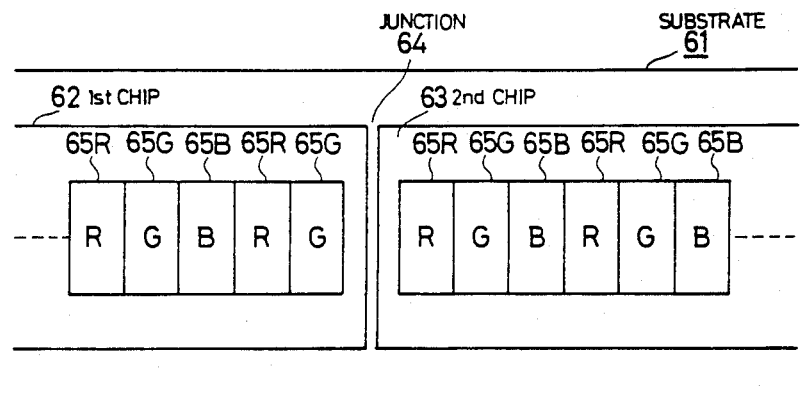
FIG. 12 is a plan view of a line sensor which has two sensor chips having RGB filters thereon and arranged in line according to still another embodiment of the present invention.

FIG. 12 shows still another embodiment wherein the blue photoelectric transducer element is omitted at the junction of the adjacent chips. The line sensor has a substrate 61. First and second color sensor chips 62 and 63 are formed on the substrate 61. A junction 64 is formed between the chips 62 and 63. Photoelectric transducer elements 65R, 65G, and 65B are obtained such that three stripe filters are formed on each chip by deposition or the like. A set of elements 65R, 65G, and 65B constitutes a pel. The blue photoelectric transducer element 65B is omitted at the junction 64. The photoelectric transducer elements 65R, 65G, and 65B comprise photoconductors, photodiodes, phototransistors, MOS transistors, MOS capacitors, or the like, respectively.

If the three color separation filters of the color sensor are complementary yellow (Y), green (G), and cyan (C) filters, these components are respectively converted into the R, G, and B signals as follows:

R = Y - G
G = G
B = C - G

Figure 13:
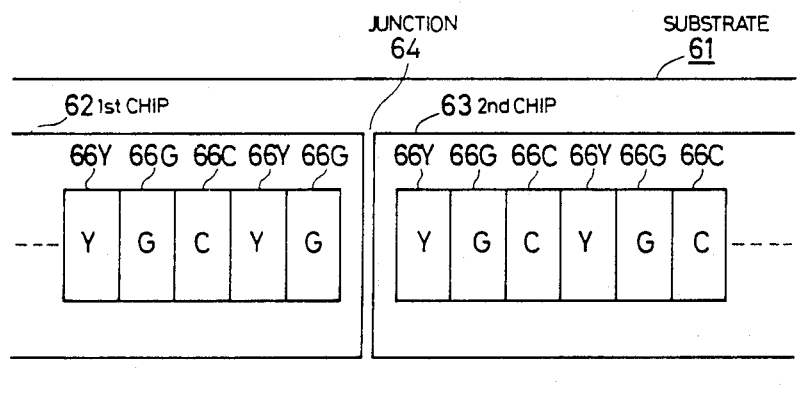
FIG. 13 is a plan view of a line sensor which has two sensor chips having YGC filters thereon and arranged in line according to still another embodiment of the present invention.

The component corresponding to the color medium Y for the printer is the cyan photoelectric transducer element in the color sensor. One cyan photoelectric transducer element 66C is omitted in a junction 64 in FIG. 13. Photoelectric transducer elements 66Y, 66G, and 66C are obtained such that three stripe filters are formed on each chip. A set of elements 66Y, 66G, and 66C constitutes a pel.

By omitting one element at the junction 64, cutting precision at the ends of the sensor chips 61 and 62 and alignment precision can have a large margin. Therefore, the color sensor can be easily manufactured. For example, by omitting one element in a high-density color line sensor of 16 pels/mm (the element density is 48 elements/mm), a margin of about 20 $\mu$m can be realized to provide practical line sensors.

A circuit for interpolating a signal for the omitted element will be described with reference to FIG. 14.

Figure 14:
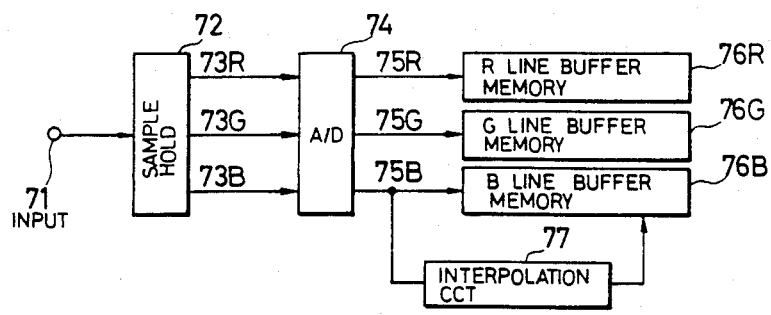
FIG. 14 is a block diagram of a circuit for processing signals from a plurality of chips.

Referring to FIG. 14, an RGB serial signal from color sensor chips is supplied to a sample hold circuit 72 through an input terminal 71. The sample hold circuit 71 converts the RGB serial signal into R, G, and B parallel signals 73R, 73G, and 73B. The parallel signals 73R. 73G, and 73B are converted into digital signals 7R, 75G, and 75B by an A/D converter 74. The digital signals 75R, 75G, and 75B are written in line buffer memories 76R, 76G, and 76B, respectively.

When the digital signals 75R, 75G, and 75B derived from the RGB serial signal from the color sensor chips 62 and 63 are written in the line buffer memories 76R, 76G, and 76B to obtain R, G, and B signals of one line, a signal for the omitted blue photoelectric transducer element is interpolated by an interpolation circuit 77. In the case of FIG. 14, the color medium Y for the printer corresponds to the blue signal, and the corresponding blue photoelectric transducer element is omitted. The interpolation circuit 77 writes in the blue line buffer memory 76B a signal from the blue photoelectric transducer element of the immediately preceding pel of a pel to be interpolated or a signal from the blue photoelectric transducer element of the immediately succeeding pel of the pel to be interpolated. The write timing is a timing corresponding to the junction.

The interpolation circuit 77 may be arranged such that a average value of the signals from the pels adjacent to the pel to be interpolated, and the average value is written as a signal from the omitted blue element.

An interpolation circuit can be arranged for the YGC filter (FIG. 13) in the same manner as in FIG. 14.

According to this embodiment described above, one photoelectric transducer element, e.g., the element which is supposed to extract a signal corresponding to the yellow medium for the printer and which influences the resolution of the resultant image little is omitted at the junction of the adjacent color sensor chips. Therefore, the color line sensor having a plurality of sensor chips aligned in line can be easily manufactured, and the yield of the line sensors can also be increased.

In a color original reading apparatus using the color line sensor of this embodiment, signals from the immediately preceding and/or succeeding pels are used to interpolate the signal for the omitted element. With this arrangement, the degradation of image quality does not substantially occur.

The present invention has been described with reference to the particular embodiments but is not limited thereto. Various changes and modifications may be made within the spirit and scope of the appended claims.

What is claimed is:

1. A color image sensor comprising:
   a substrate;
   a plurality of sensor chips provided on said substrate, each chip having a plurality of photocells; and a plurality of red, green, and blue filters provided on each plurality of photocells in a predetermined order, wherein said plurality of sensor chips are aligned in a line configuration and the photocells adjacent a junction of said plurality of sensor chips are spaced from each other by a predetermined distance, and wherein only the red and green filters are provided on the photocells adjacent the junction.

2. A sensor according to claim 1, wherein the photocells adjacent the junction are spaced apart by a distance which is equal to a width of a photocell adjacent the junction.

3. A color image reading apparatus comprising:
   a plurality of sensor chips aligned in a line configuration and each having a plurality of photocells, the photocells adjacent a junction of said plurality of sensor chips being spaced apart by a predetermine distance;
   a plurality of red, green and blue filters provided on each plurality of photocells in a predetermined order, only the red and green filters being provided on photocells adjacent the junction;
   means for generating a plurality of color signals corresponding to said plurality of red, green, and blue filters respectively, on the basis on the output signals from said plurality of sensor chips; and
   means for forming a modified color signal for an area lying between the photocells adjacent the junction.

4. An apparatus according to claim 3, wherein the photocells adjacent the junction are spaced apart by a distance which is equal to a width of the photocell.

5. An apparatus according to claim 3, wherein said estimating means comprises means for producing the modified color signal on the basis of the output signals from said plurality of sensor chips.

6. A color image sensor comprising:
   a substrate;
   a plurality of sensor chips provided on said substrate, each chip having a plurality of photocells; and
   a plurality of yellow, green and cyan filters provided on each plurality of photocells in a predetermined order, wherein said plurality of sensor chips are aligned in a line configuration and the photocells adjacent a junction of said plurality of sensor chips are spaced from each other by a predetermined distance, and wherein only the yellow and green filters are provided on the photocells adjacent the junction.

7. A sensor according to claim 6, wherein the photocells adjacent the junction are spaced apart by a distance which is equal to a width of a photocell adjacent the junction.

8. A color image reading apparatus comprising:
   a plurality of sensor chips aligned in a line configuration and each having a plurality of photocells, the photocell adjacent a junction of said plurality of sensor chips being spaced apart by a predetermine distance;
   a plurality of yellow, green and cyan filters provided on each plurality of photocells in a predetermined order, wherein only the yellow and green filters are provided on photocells adjacent the junction;

means for generating a plurality of color signals corresponding to said plurality of the yellow, green and cyan filters, respectively, on the basis of the output signals from said plurality of sensor chips; and means for forming a modified color signal for an area lying between the photocells adjacent the junction.

9. An apparatus according to claim 8, wherein the photocells adjacent the junction are spaced apart by a distance which is equal to a width of a photocell.

10. An apparatus according to claim 8, wherein said means for forming a modified color signal comprises means for producing the modified color signal on the basis of the output signal form said plurality of sensor chips.

* * * * *

UNITED STATES PATENT AND TRADEMARK OFFICE
CERTIFICATE OF CORRECTION

PATENT NO. : 4,870,483
DATED : September 26, 1989
INVENTOR(S) : Yuji Nishigaki, et al.

It is certified that error appears in the above-identified patent and that said Letters Patent is hereby corrected as shown below:

COLUMN 1:

Line 61, "a" (first occurrence) should read --the--.

COLUMN 2:

Line 65, "inline" should read --in line--.

COLUMN 3:

Line 5, "sensor pats" should read --sensor parts--.

Line 46, "sensor" should read --sensor;--.

COLUMN 4:

Line 56, "12B," should read --12B, . . .--.

COLUMN 7:

Line 24, "73R." should read --73R,--, and "digital signals 7R," should read --digital signals 75R,--.

Line 46, "a" should read --an--.

UNITED STATES PATENT AND TRADEMARK OFFICE
CERTIFICATE OF CORRECTION

PATENT NO. : 4,870,483

DATED : September 26, 1989

INVENTOR(S) : Yuji Nishigaki, et al.

It is certified that error appears in the above-identified patent and that said Letters Patent is hereby corrected as shown below:

COLUMN 8:

Line 25, "predetermine" should read --predetermined--.

Line 65, "predetermine" should read --predetermined--.

COLUMN 10:

Line 7, "form" should read --from--.

Signed and Sealed this

Tenth Day of September, 1991

Attest:

HARRY F. MANBECK, JR.

*Attesting Officer*      *Commissioner of Patents and Trademarks*